(12) United States Patent
Kobayashi et al.

(10) Patent No.: US 11,359,677 B2
(45) Date of Patent: *Jun. 14, 2022

(54) PLUNGING TYPE CONSTANT VELOCITY UNIVERSAL JOINT FOR REAR-WHEEL DRIVE SHAFT

(71) Applicant: NTN CORPORATION, Osaka (JP)

(72) Inventors: Masazumi Kobayashi, Shizuoka (JP); Tomoshige Kobayashi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 259 days.

This patent is subject to a terminal disclaimer.

(21) Appl. No.: 16/494,393

(22) PCT Filed: Mar. 8, 2018

(86) PCT No.: PCT/JP2018/008949
§ 371 (c)(1),
(2) Date: Sep. 16, 2019

(87) PCT Pub. No.: WO2018/168631
PCT Pub. Date: Sep. 20, 2018

(65) Prior Publication Data
US 2020/0240476 A1    Jul. 30, 2020

(30) Foreign Application Priority Data

Mar. 17, 2017   (JP) .............................. JP2017-052646
Mar. 2, 2018    (JP) .............................. JP2018-037352

(51) Int. Cl.
F16D 3/227        (2006.01)
F16D 3/223        (2011.01)

(52) U.S. Cl.
CPC .... F16D 3/227 (2013.01); *F16D 2003/22313* (2013.01); *Y10S 464/906* (2013.01)

(58) Field of Classification Search
CPC ........... F16D 3/227; F16D 2003/22313; Y10S 464/906
(Continued)

(56) References Cited

U.S. PATENT DOCUMENTS 3,714,797 A    2/1973   Fisher
6,299,543 B1   10/2001  Sone et al.
(Continued)

FOREIGN PATENT DOCUMENTS

JP    52-26657    6/1977
JP    10-73129    3/1998
(Continued)

OTHER PUBLICATIONS

Extended European Search Report dated Nov. 11, 2020 in corresponding European Patent Application No. 18767261.3.
(Continued)

*Primary Examiner* — Greg Binda
(74) *Attorney, Agent, or Firm* — Wenderoth, Lind & Ponack, L.L.P.

(57) ABSTRACT

A plunging type constant velocity universal joint includes an outer joint member, an inner joint member, eight balls, and a cage. A curvature center of a spherical portion of an outer peripheral surface of the cage and a curvature center of a spherical portion of an inner peripheral surface of the cage are offset to opposite sides in the axial direction with respect to a joint center by an equal distance. A ratio $PCD_{BALL}/D_{BALL}$ of a pitch circle diameter $PCD_{BALL}$ of the balls to a diameter $D_{BALL}$ of each of the balls is set from 3.3 to 3.6. A ratio $T_I/D_{BALL}$ of a radial thickness $T_I$ of the inner joint member to the diameter $D_{BALL}$ of each of the balls is set from 0.30 to 0.45.

5 Claims, 10 Drawing Sheets

(58) Field of Classification Search
USPC .......................................................... 464/146
See application file for complete search history.

(56) References Cited

U.S. PATENT DOCUMENTS

| | | |
|---|---|---|
| 2016/0201732 A1 | 7/2016 | Kim |
| 2021/0172481 A1* | 6/2021 | Kobayashi .............. F16D 3/227 |

FOREIGN PATENT DOCUMENTS

| | | |
|---|---|---|
| JP | 2009-250342 | 10/2009 |
| JP | 2012-097797 | 5/2012 |
| JP | 2013-189995 | 9/2013 |
| WO | 2015/020248 | 2/2015 |

OTHER PUBLICATIONS

International Search Report dated Jun. 5, 2018 in International (PCT) Application No. PCT/JP2018/008949.
International Preliminary Report on Patentability dated Sep. 17, 2019 in International (PCT) Patent Application No. PCT/JP2018/008949.

* cited by examiner

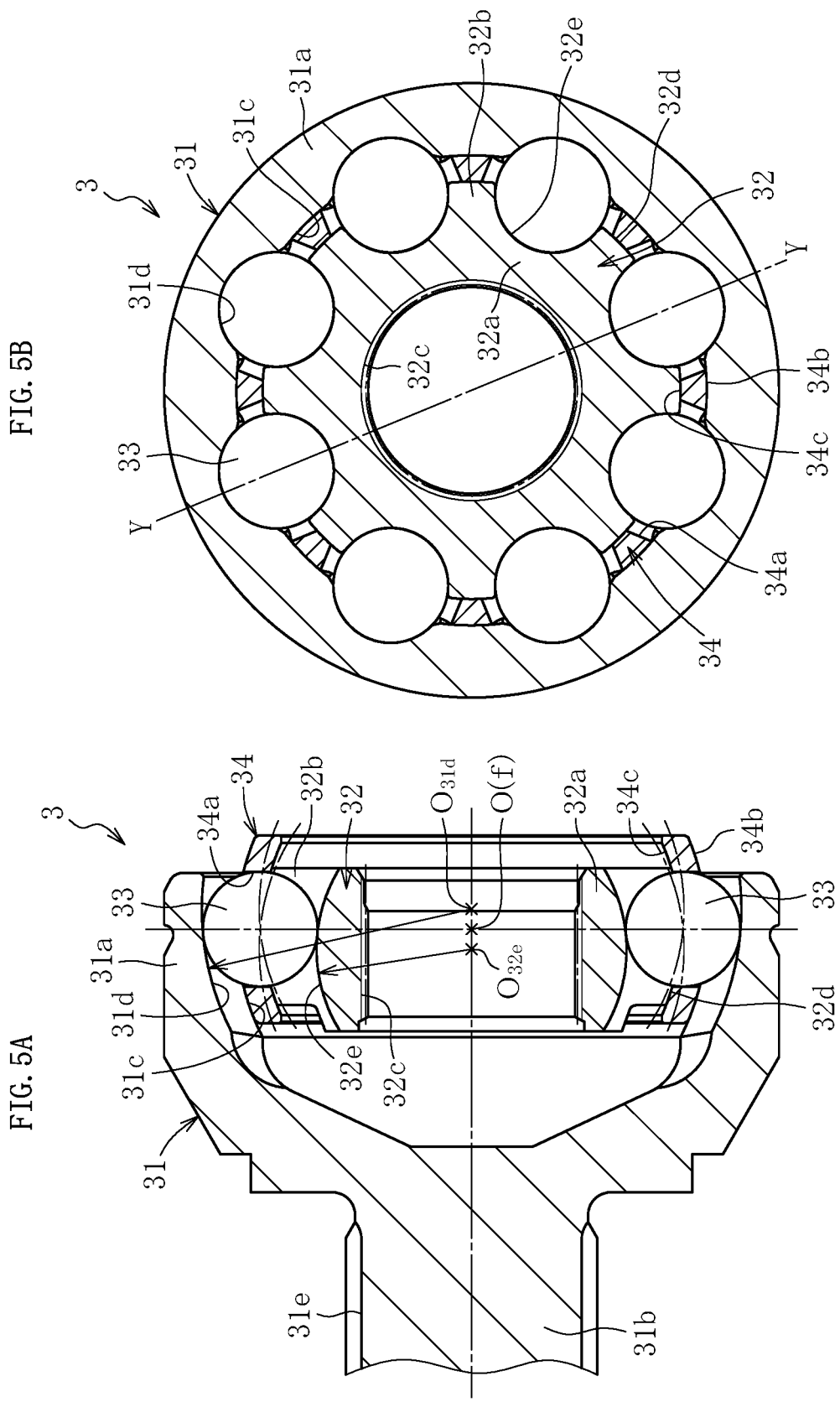

FIG. 6B Comparative Product
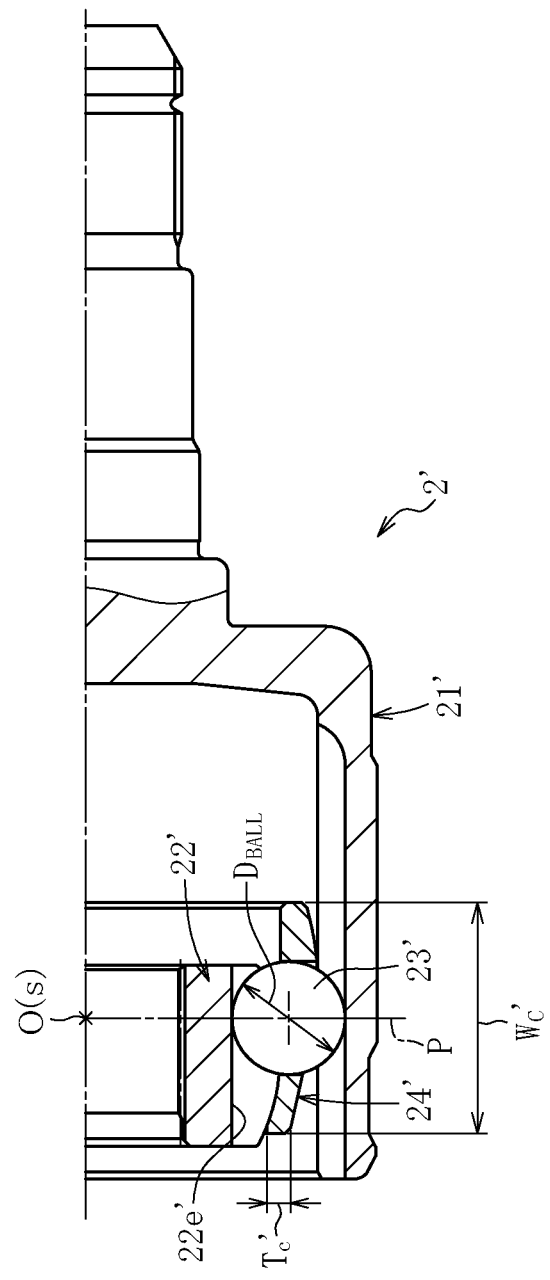

FIG. 7A
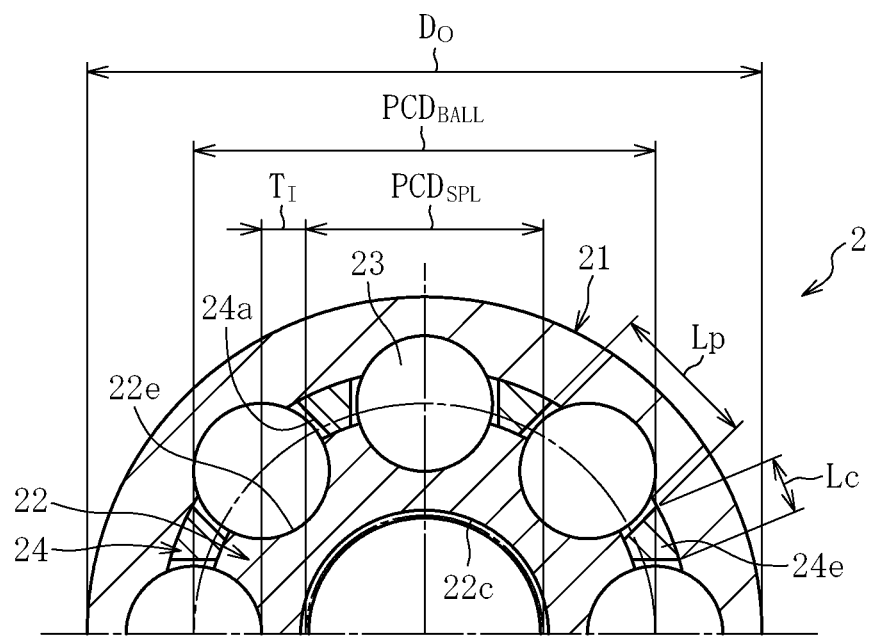
FIG. 7B  Comparative Product
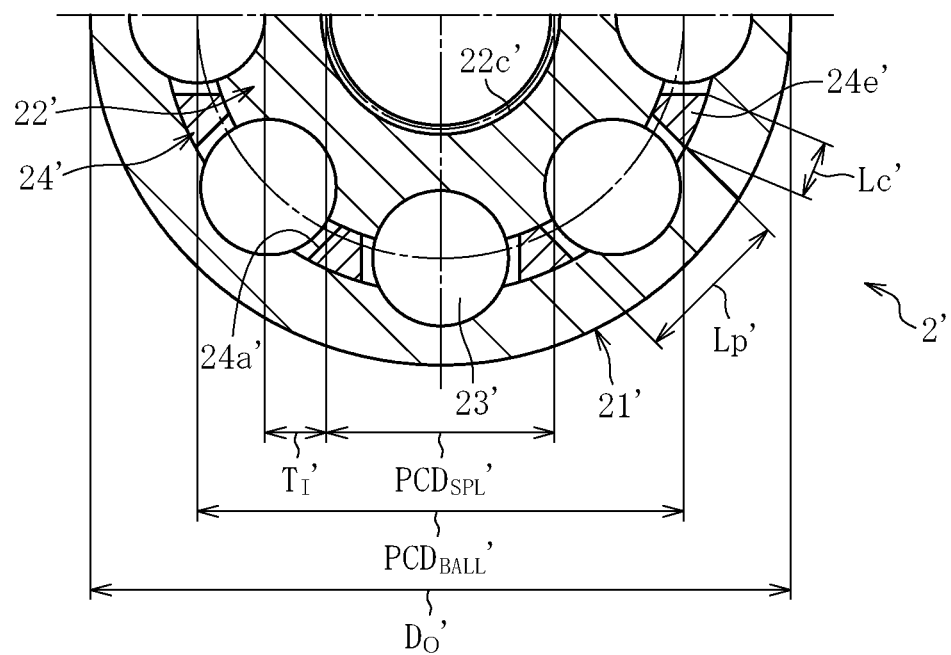

FIG. 8A
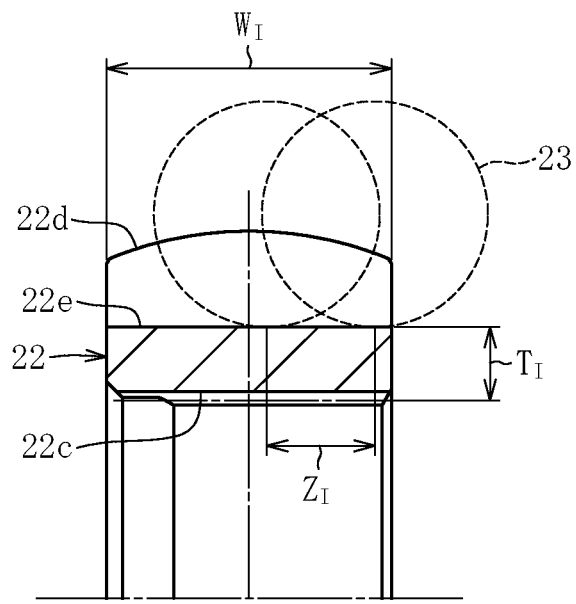
FIG. 8B Comparative Product
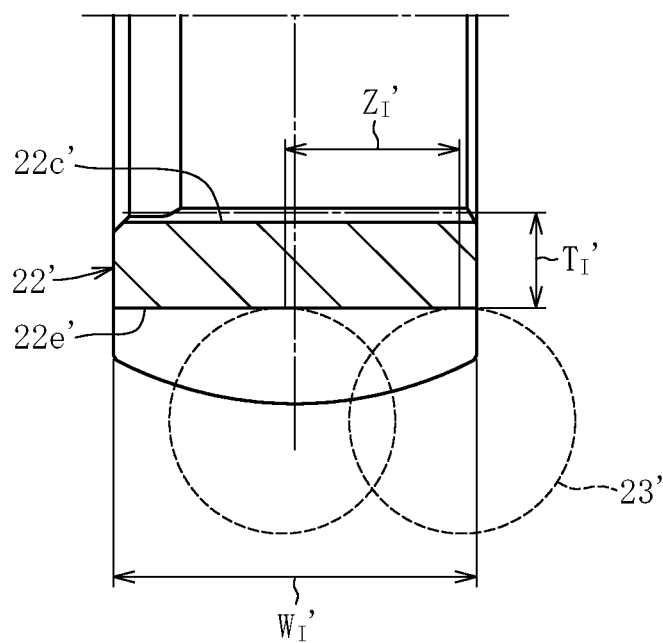

PLUNGING TYPE CONSTANT VELOCITY UNIVERSAL JOINT FOR REAR-WHEEL DRIVE SHAFT

TECHNICAL FIELD

The present invention relates to a plunging type constant velocity universal joint, and more particularly, to a plunging type constant velocity universal joint to be used for a rear-wheel drive shaft of an automobile.

BACKGROUND ART

In general, a drive shaft of an automobile includes an outboard-side constant velocity universal joint mounted to a wheel, an inboard-side constant velocity universal joint mounted to a differential gear, and an intermediate shaft coupling both the constant velocity universal joints to each other. Typically, as the outboard-side constant velocity universal joint, there is used a fixed type constant velocity universal joint that can form a large operating angle but is not displaced in an axial direction thereof. Meanwhile, as the inboard-side constant velocity universal joint, there is used a plunging type constant velocity universal joint that has a relatively small maximum operating angle and can be displaced in the axial direction while forming the operating angle.

A demand for reduction in weight of an automobile is as high as ever, and a power transmission mechanism including drive shafts is also required to achieve further reduction in weight and size. Accordingly, a plunging type constant velocity universal joint, which is incorporated into an inboard-side end portion of the drive shaft, is also required to achieve further reduction in weight and size.

As a representative of the plunging type constant velocity universal joint, a double offset constant velocity universal joint is known. In the double offset constant velocity universal joint, a curvature center of a spherical portion formed on an outer peripheral surface of a cage and a curvature center of a spherical portion formed on an inner peripheral surface of the cage are offset to opposite sides in an axial direction of the joint with respect to a joint center by an equal distance. With this configuration, balls are always retained within a plane obtained by bisection of an operating angle, thereby ensuring a constant velocity characteristic between an outer joint member and an inner joint member. The double offset constant velocity universal joint typically includes six torque transmission balls. In Patent Literature 1 below, a double offset constant velocity universal joint including eight torque transmission balls is disclosed. When the number of the balls is thus set to eight, reduction in weight and size can be achieved while ensuring strength, load capacity, and durability equivalent to or higher than those of the double offset constant velocity universal joint including the six balls.

CITATION LIST

Patent Literature 1: JP H10-73129 A
Patent Literature 2: JP 2012-97797 A

SUMMARY OF INVENTION

Technical Problem

The double offset constant velocity universal joint including the eight balls as disclosed in Patent Literature 1 above is put to practical use as a mass-produced product. The present invention has been made through study on further reduction in weight and size of the plunging type constant velocity universal joint of this type.

For example, in Patent Literature 2 above, a rear-wheel drive shaft is disclosed. In the rear-wheel drive shaft, a diameter of a spline formed in each end portion of an intermediate shaft (hollow shaft) is increased so that the hollow shaft has a sufficient margin of strength. Thus, reduction in thickness is available, and hence reduction in weight of the hollow shaft is also achieved. However, the invention proposed in Patent Literature 2 is made to achieve the reduction in weight and increase in strength of a hollow shaft to be used for a rear-wheel drive shaft. In Patent Literature 2, no description is made of an object to achieve the reduction in weight and size of the plunging type constant velocity universal joint.

Therefore, an object to be achieved by the present invention is to further reduce a weight and a size of a plunging type constant velocity universal joint through study on internal specifications of the plunging type constant velocity universal joint to be used for a rear-wheel drive shaft, in particular, a double offset constant velocity universal joint comprising eight balls.

Solution to Problem

A fixed type constant velocity universal joint provided on an outboard side of a drive shaft is directly mounted to a wheel, and hence a maximum operating angle of the fixed type constant velocity universal joint significantly differs between a case in which the joint is mounted to a front wheel being a steered wheel and a case in which the joint is mounted to a rear wheel that is not steered. Meanwhile, a plunging type constant velocity universal joint provided on an inboard side of the drive shaft is not directly mounted to the wheel, and hence is hardly affected by a steering angle of the wheel. Accordingly, in view of, for example, mass production cost, the plunging type constant velocity universal joints having the same specifications are hitherto used for the front-wheel drive shaft and the rear-wheel drive shaft.

However, the inventors of the present invention have focused on the fact that, when the plunging type constant velocity universal joint is used exclusively for the rear-wheel drive shaft, the maximum operating angle can be reduced. That is, a large number of components are arranged at a vicinity of a front wheel of a vehicle, and hence a space is limited. Thus, for example, as illustrated in FIG. 9A, in some cases, it is inevitable that an axial center of a front wheel FW and an axial center of a differential gear G be arranged in an offset manner in a front-and-rear direction of the vehicle. In this case, in constant velocity universal joints J11 and J12 provided on a front-wheel drive shaft DS1, a normal operating angle (operating angle when an automobile runs straight at a constant speed) α in the front-and-rear direction of the vehicle is not 0°, but the constant velocity universal joints J11 and J12 always rotate under a state of forming the operating angle in the front-and-rear direction of the vehicle. Therefore, the plunging type constant velocity universal joint J12 is affected in a complex manner by the above-mentioned normal operating angle α in the front-and-rear direction of the vehicle and an operating angle in an up-and-down direction accompanied with up-and-down movement of the wheel with respect to a vehicle body. Thus, the plunging type constant velocity universal joint J12 is required to have a relatively large operating angle.

In contrast, at a vicinity of a rear wheel of the vehicle, there is a relatively sufficient margin of arrangement space for components. Thus, typically, as illustrated in FIG. 9B, an axial center of a rear wheel RW and the axial center of the differential gear G are arranged under a state of being hardly offset to each other in a front-and-rear direction of the vehicle body. In this case, the constant velocity universal joints J21 and J22 for a rear-wheel drive shaft DS2 form a normal operating angle of about 0° in the front-and-rear direction of the vehicle, and hence the plunging type constant velocity universal joint J22 to be used for the rear-wheel drive shaft DS2 may have an operating angle smaller than that of the plunging type constant velocity universal joint J21 to be used for the front-wheel drive shaft DS1. Therefore, when the plunging type constant velocity universal joint is used exclusively for the rear-wheel drive shaft, the maximum operating angle can be reduced.

Based on the knowledge described above, according to one embodiment of the present invention, there is provided a plunging type constant velocity universal joint to be used for a rear-wheel drive shaft. The plunging type constant velocity universal joint includes an outer joint member having a cylindrical inner peripheral surface in which eight track grooves extending in an axial direction of the plunging type constant velocity universal joint are formed, an inner joint member having a spherical outer peripheral surface in which eight track grooves extending in the axial direction are formed, and having a spline hole formed along an axial center of the inner joint member, and eight balls arranged in ball tracks formed by the track grooves of the outer joint member and the track grooves of the inner joint member. The plunging type constant velocity universal joint also includes a cage, which has eight pockets configured to receive the balls, and is held in slide contact with the inner peripheral surface of the outer joint member and the outer peripheral surface of the inner joint member. A curvature center of a spherical portion formed on an outer peripheral surface of the cage and a curvature center of a spherical portion formed on an inner peripheral surface of the cage are offset to opposite sides in the axial direction with respect to a joint center by an equal distance. A ratio $PCD_{BALL}/D_{BALL}$ of a pitch circle diameter $PCD_{BALL}$ of the balls to a diameter $D_{BALL}$ of each of the balls is set from 3.3 to 3.6, and a ratio $T_I/D_{BALL}$ of a radial thickness $T_I$ of the inner joint member to the diameter $D_{BALL}$ of each of the balls is set from 0.30 to 0.45.

In the plunging type constant velocity universal joint, loads are applied evenly to the respective balls under a state in which an operating angle is 0°. However, when the operating angle is formed, uneven loads are applied to the respective balls, and a difference in loads applied to the respective balls becomes larger as the operating angle becomes larger. Therefore, in a case of the large operating angle, maximum loads applied to the respective balls are large, and hence members (the outer joint member, the inner joint member, and the cage) held in contact with the balls are required to have thicknesses large enough to bear the maximum loads applied from the balls. Accordingly, when the plunging type constant velocity universal joint is used exclusively for the rear-wheel drive shaft to reduce the maximum operating angle as described above, the maximum loads applied to the balls are reduced, and each component held in contact with the balls has a sufficient margin of strength. Thus, without causing reduction in load capacity and durability, a thickness of each component, for example, a radial thickness of the inner joint member (specifically, a radial distance between a groove bottom of each of the track grooves of the inner joint member and a pitch circle of the spline hole) can be reduced. In this manner, the track grooves formed in the outer peripheral surface of the inner joint member can be closer to a radially inner side, and hence a pitch circle diameter of the track grooves, that is, the pitch circle diameter of the balls arranged in the track grooves can be reduced as compared to that of a conventional product (double offset constant velocity universal joint having a large operating angle and including eight balls, which is applicable to both the front-wheel drive shaft and the rear-wheel drive shaft). Thus, a size of the plunging type constant velocity universal joint in the radial direction can be reduced, and hence reduction in weight can be achieved.

When the plunging type constant velocity universal joint rotates under a state of forming the operating angle, the balls rotate while undergoing displacement in a circumferential direction with respect to the cage. Accordingly, in order to allow the balls to move in the circumferential direction, the pockets of the cage each have a thin shape elongated in the circumferential direction, and a circumferential dimension of each of the pockets is determined depending on the maximum operating angle of the constant velocity universal joint. The conventional product has a large maximum operating angle, and hence a circumferential length of each of the pockets is increased. Thus, it has been required to increase a diameter of the cage in order to ensure the circumferential length of each of the pockets. Therefore, a diameter of the outer peripheral surface of the inner joint member to be held in slide contact with the inner peripheral surface of the cage is increased. Consequently, the inner joint member has an excessively large thickness that is more than necessary in view of strength.

In contrast, when the plunging type constant velocity universal joint is used exclusively for the rear-wheel drive shaft to reduce the maximum operating angle as described above, the circumferential dimension of each of the pockets of the cage can be reduced. Accordingly, a diameter of the cage can be reduced, and the diameter of the outer peripheral surface of the inner joint member to be held in slide contact with the inner peripheral surface of the cage can be reduced. Thus, a radial thickness of the inner joint member is reduced as compared to that of the conventional product so that the radial thickness can be set to an appropriate value (minimum value necessary in view of strength). Accordingly, the pitch circle diameter of the balls is reduced as described above, thereby being capable of reducing a size of the plunging type constant velocity universal joint in the radial direction.

Incidentally, the constant velocity universal joints are mass-produced products. Thus, typically, stepwise sizes are set for the constant velocity universal joints in accordance with torque load capacity, and internal specifications (for example, dimensions and shapes of components) are set for each size (a series of the constant velocity universal joints is launched). In order to achieve reduction in weight and size of the constant velocity universal joint of respective sizes, when the ball diameter is reduced, contact pressure at contact portions between the balls and the track grooves is increased, which directly causes reduction in torque load capacity. Accordingly, when study is made on design change of the constant velocity universal joint, in order to maintain torque load capacity, the ball diameter is not changed in most cases unless the number of the balls is increased. Therefore, when a dimension of each component is represented by a ratio to the ball diameter, the internal specifications of the constant velocity universal joint in accordance with torque load capacity (that is, size of the constant velocity universal joint) can be shown. As descried above, the plunging type constant velocity universal joint is used exclusively for the rear-wheel drive shaft to reduce the maximum operating angle, and the dimension of each component with respect to the ball diameter {specifically, a ratio ($PCD_{BALL}/D_{BALL}$) of the pitch circle diameter of the balls to the ball diameter and a ratio ($T_i/D_{BALL}$) of the radial thickness of the inner joint member to the ball diameter} is reduced as compared to that of the conventional product. In this manner, a new series of plunging type constant velocity universal joints each having a small weight and a small size can be launched.

Further, the radial thickness of the inner joint member is reduced as described above, and hence a diameter of the spline hole formed along the axial center of the inner joint member can be increased. In this manner, a diameter of a shaft to be inserted into the spline hole is increased, thereby improving torsional strength of the shaft. Specifically, a ratio $PCD_{SPL}/D_{BALL}$ of the pitch circle diameter $PCD_{SPL}$ of the spline hole of the inner joint member to the diameter $D_{BALL}$ of each of the balls can be set from 1.70 to 1.85 (preferably from 1.75 to 1.85).

When the maximum operating angle of the plunging type constant velocity universal joint is reduced, the pitch circle diameter of the balls can be reduced as described above, and hence a diameter of the outer joint member can be reduced. Further, when the maximum operating angle of the plunging type constant velocity universal joint is reduced, the thickness of the inner joint member can be reduced as described above, and hence a diameter of the spline hole of the inner joint member can be increased. From the above description, a ratio $D_O/PCD_{SPL}$ of an outer diameter $D_O$ of the outer joint member to the pitch circle diameter $PCD_{SPL}$ of the spline hole of the inner joint member can be reduced, specifically, the ratio $D_O/PCD_{SPL}$ can be set from 2.7 to 3.0. In this manner, reduction in weight and size of the plunging type constant velocity universal joint, and improvement in strength of the intermediate shaft can be achieved at the same time.

The above-mentioned plunging type constant velocity universal joint may have a maximum operating angle of 20° or less.

Advantageous Effects of Invention

As described above, according to the present invention, in the plunging type constant velocity universal joint to be used for the rear-wheel drive shaft, through setting of the internal specifications (the pitch circle diameter of the balls and the radial thickness of the inner joint member determined with respect to the ball diameter) based on a design concept different from that of the related art, further reduction in weight and size can be achieved while maintaining torque load capacity.

BRIEF DESCRIPTION OF DRAWINGS

FIG. 5A is a longitudinal sectional view (sectional view taken along the line Y-Y of FIG. 5B) for illustrating a fixed type constant velocity universal joint incorporated into the above-mentioned rear-wheel drive shaft.

FIG. 5B is a transverse sectional view (sectional view taken along the plane including a joint center of FIG. 5A) for illustrating the above-mentioned fixed type constant velocity universal joint.

FIGS. 6A and 6B are longitudinal sectional views for illustrating the plunging type constant velocity universal joint, in which FIG. 6A is an illustration of a product of the present invention, and FIG. 6B is an illustration of a comparative product.

FIGS. 7A and 7B are transverse sectional views for illustrating the plunging type constant velocity universal joint taken along the plane including a joint center, in which FIG. 7A is an illustration of the product of the present invention, and FIG. 7B is an illustration of the comparative product.

FIGS. 8A and 8B are longitudinal sectional views for illustrating an inner joint member of the plunging type constant velocity universal joint, in which FIG. 8A is an illustration of the product of the present invention, and FIG. 8B is an illustration of the comparative product.

DESCRIPTION OF EMBODIMENTS

Now, an embodiment of the present invention is described with reference to the drawings.

Figure 1:
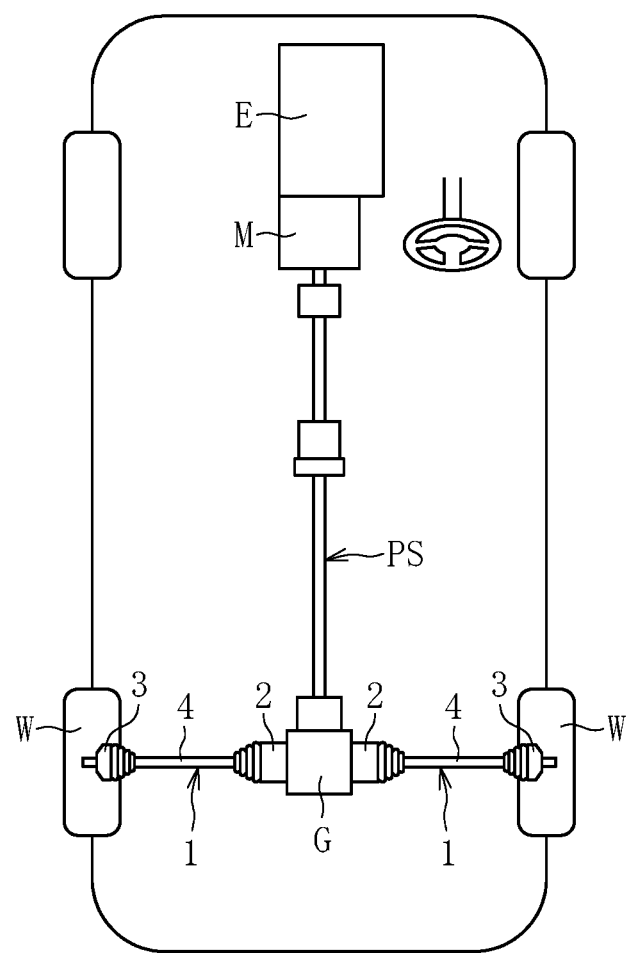
FIG. 1 is a plan view for schematically illustrating a power transmission mechanism for a rear-wheel drive vehicle.

FIG. 1 is an illustration of a power transmission mechanism for a rear-wheel drive vehicle (such as an FR vehicle) of an independent suspension type. In this power transmission mechanism, a rotational drive force output from an engine E is transmitted to a differential gear G through a transmission M and a propeller shaft PS, and then is transmitted to right and left rear wheels (wheel W) through right and left rear-wheel drive shafts 1.

Figure 2:
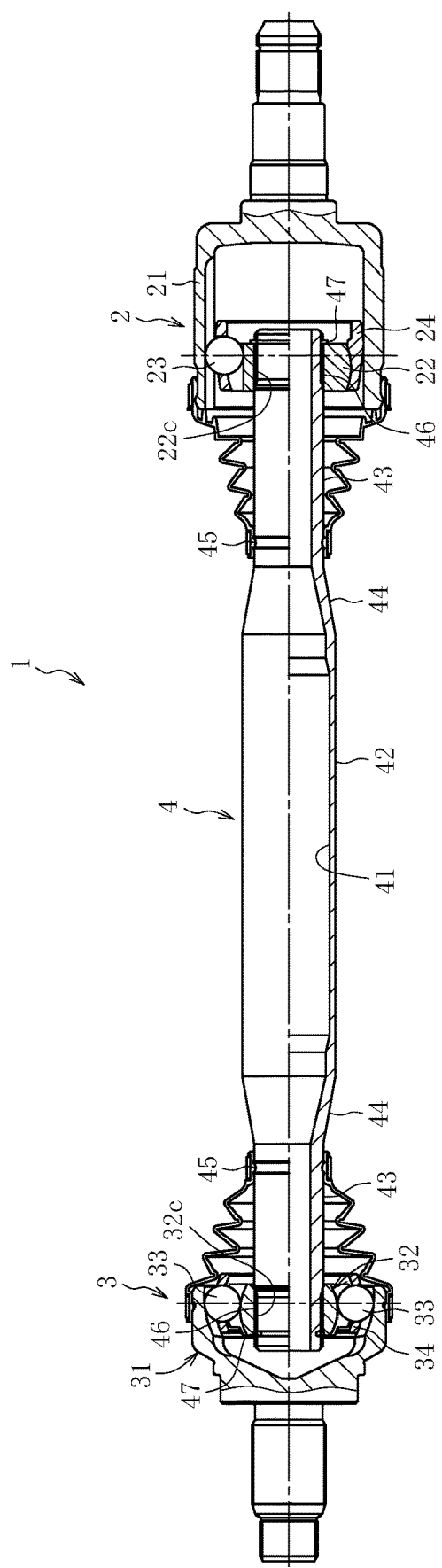
FIG. 2 is a sectional view for illustrating a rear-wheel drive shaft.

As illustrated in FIG. 2, the rear-wheel drive shaft 1 comprises a plunging type constant velocity universal joint 2, a fixed type constant velocity universal joint 3, and an intermediate shaft 4. The plunging type constant velocity universal joint 2 is provided on an inboard side (right side in FIG. 2) and is configured to allow both axial displacement and angular displacement. The fixed type constant velocity universal joint 3 is provided on an outboard side (left side in FIG. 2) and is configured to allow only angular displacement. The rear-wheel drive shaft 1 has the structure in which both the constant velocity universal joints 2 and 3 are coupled by the intermediate shaft 4. The plunging type constant velocity universal joint 2 on the inboard side is coupled to the differential gear G, and the fixed type constant velocity universal joint 3 on the outboard side is coupled to the wheel W (see FIG. 1).

Figure 3:
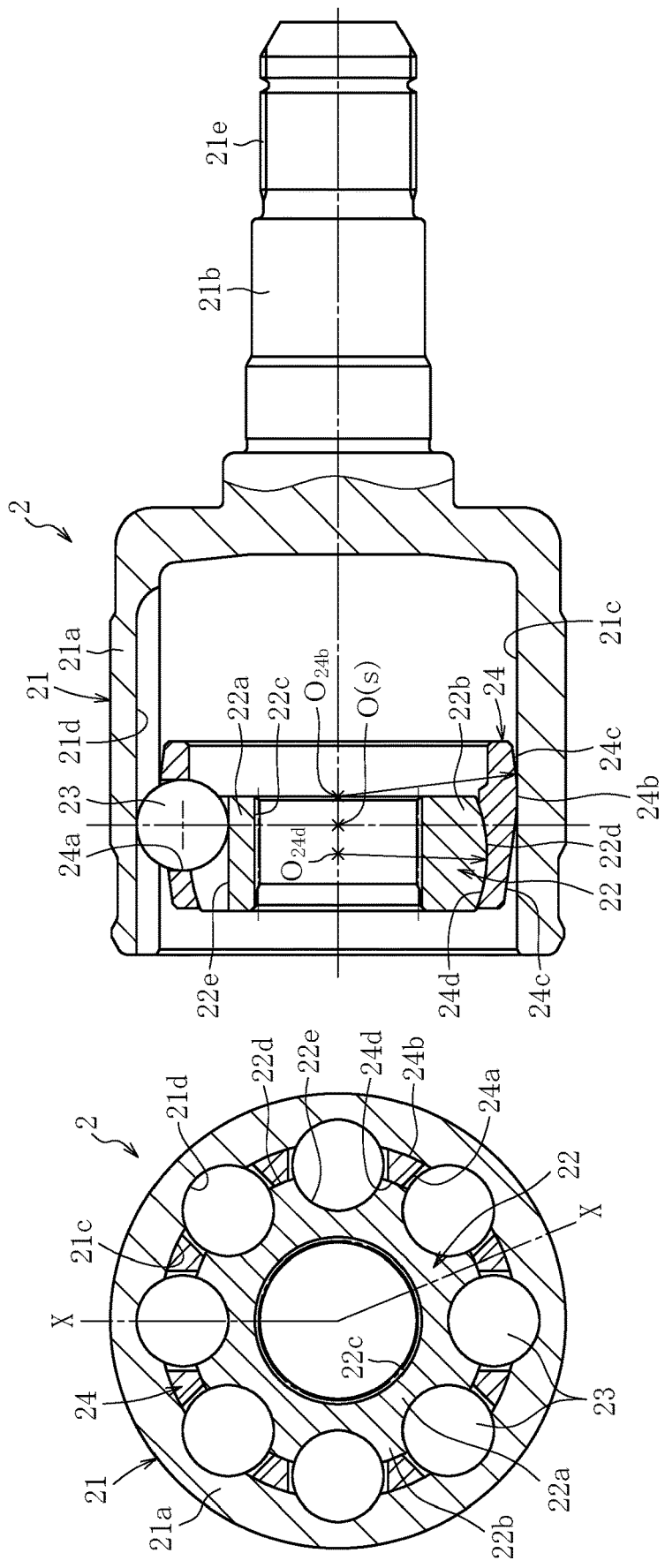
FIG. 3A is a longitudinal sectional view (sectional view taken along the line X-X of FIG. 3B) for illustrating a plunging type constant velocity universal joint incorporated into the above-mentioned rear-wheel drive shaft.
FIG. 3B is a transverse sectional view (sectional view taken along the plane including a joint center of FIG. 3A) for illustrating the above-mentioned plunging type constant velocity universal joint.

As illustrated in FIG. 3, the plunging type constant velocity universal joint 2 comprises an outer joint member 21, an inner joint member 22, eight balls 23, and a cage 24. The outer joint member 21 is mounted to the differential gear G (see FIG. 1). The inner joint member 22 is mounted to an inboard-side end portion of the intermediate shaft 4 (see FIG. 2). The eight balls 23 are configured to transmit torque between the outer joint member 21 and the inner joint member 22. The cage 24 is configured to retain the eight balls 23.

The outer joint member 21 integrally comprises a mouth section 21a and a stem section 21b. The mouth section 21a has a cup shape that is open toward one side in an axial direction of the joint (outboard side or left side in FIG. 3A). The stem section 21b extends from a bottom portion of the mouth section 21a to another side in the axial direction (inboard side or right side in FIG. 3A). Eight linear track grooves 21d extending in the axial direction are formed in a cylindrical inner peripheral surface 21c of the mouth section 21a. A spline 21e to be inserted into a spline hole of the differential gear G is formed in an outer peripheral surface of an inboard-side end portion of the stem section 21b. The mouth section 21a and the stem section 21b may be integrally made of the same material, or may be joined to each other by, for example, welding after the mouth section 21a and the stem section 21b are formed into separate sections.

A spline hole 22c into which the intermediate shaft 4 is to be inserted is formed along an axial center of the inner joint member 22. Eight linear track grooves 22e extending in the axial direction are formed in a spherical outer peripheral surface 22d of the inner joint member 22. That is, the inner joint member 22 integrally comprises a cylindrical portion 22a and a plurality of protruding portions 22b. The cylindrical portion 22a has the spline hole 22c. The plurality of protruding portions 22b protrude from the cylindrical portion 22a radially outward. The track grooves 22e are formed in circumferential regions between the plurality of protruding portions 22b. Radially outer surfaces of the plurality of protruding portions 22b form the spherical outer peripheral surface 22d of the inner joint member 22.

The track grooves 21d of the outer joint member 21 and the track grooves 22e of the inner joint member 22 are opposed to each other in a radial direction to form eight ball tracks, and the balls 23 are arranged one by one in the ball tracks, respectively. A transverse sectional shape of each of the track grooves 21d and 22e is an elliptic shape or a Gothic arch shape. With this configuration, the track grooves 21d and 22e and the balls 23 are held in contact with each other at a contact angle of from about 30° to about 45°, in other words, held in so-called angular contact with each other. A transverse sectional shape of each of the track grooves 21d and 22e may be an arc shape, and the track grooves 21d and 22e and the balls 23 may be held in so-called circular contact with each other.

Figure 4:
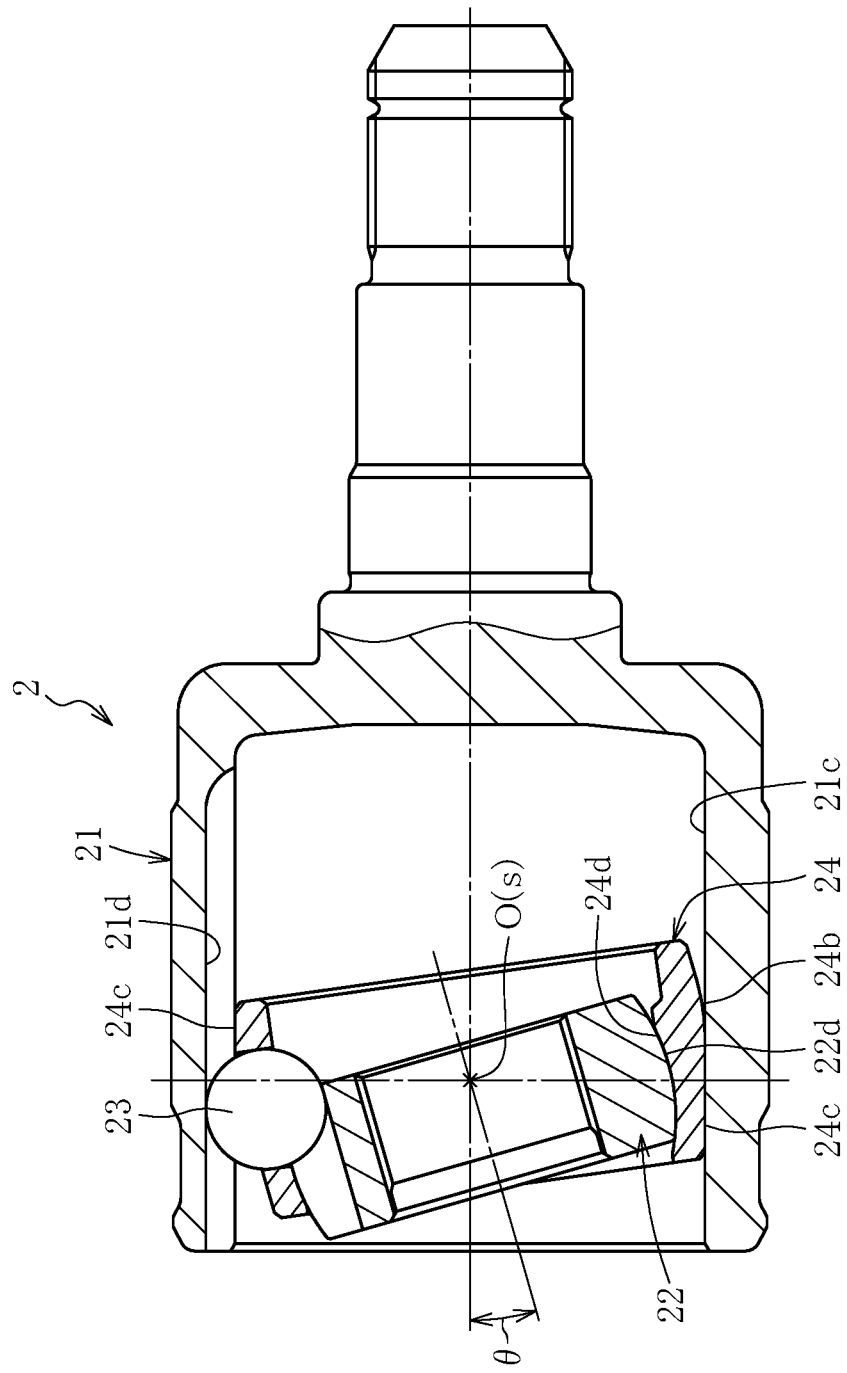
FIG. 4 is a longitudinal sectional view for illustrating a state in which the plunging type constant velocity universal joint of FIG. 3 forms a maximum operating angle.

The cage 24 has eight pockets 24a configured to retain the balls 23. All the eight pockets 24a have the same shape, and are arranged at equal intervals in a circumferential direction of the cage 24. An outer peripheral surface of the cage 24 comprises a spherical portion 24b and conical portions 24c. The spherical portion 24b is held in slide contact with the cylindrical inner peripheral surface 21c of the outer joint member 21. The conical portions 24c extend in tangential directions from both end portions of the spherical portion 24b in the axial direction. As illustrated in FIG. 4, when the plunging type constant velocity universal joint 2 forms a maximum operating angle θ, each of the conical portions 24c functions as a stopper configured to restrain further increase in operating angle through linear contact with the inner peripheral surface 21c of the outer joint member 21. An inclination angle of the conical portions 24c with respect to the axial center of the cage 24 is set to a half of a value of the maximum operating angle θ of the plunging type constant velocity universal joint 2. A spherical portion 24d is formed on the inner peripheral surface of the cage 24, and is held in slide contact with the spherical outer peripheral surface 22d of the inner joint member 22. Through axial sliding of the spherical portion 24b of the outer peripheral surface of the cage 24 and the cylindrical inner peripheral surface 21c of the outer joint member 21, axial displacement is allowed between the outer joint member 21 and the inner joint member 22.

As illustrated in FIG. 3, a curvature center $O_{24b}$ of the spherical portion 24b of the outer peripheral surface of the cage 24, and a curvature center $O_{24d}$ of the spherical portion 24d of the inner peripheral surface of the cage 24 (that is, curvature center of the spherical outer peripheral surface 22d of the inner joint member 22) are offset to opposite sides in the axial direction with respect to joint center O(s) by an equal distance. In the illustrated example, the curvature center $O_{24b}$ of the spherical portion 24b of the outer peripheral surface of the cage 24 is offset to the inboard side (joint deep side) with respect to the joint center O(s), and the curvature center $O_{24d}$ of the spherical portion 24d of the inner peripheral surface of the cage 24 is offset to the outboard side (joint opening side) with respect to the joint center O(s). With this configuration, at a freely-selected operating angle, the balls 23 retained by the cage 24 are always arranged within a plane obtained by bisection of the operating angle, thereby ensuring a constant velocity characteristic between the outer joint member 21 and the inner joint member 22.

As illustrated in FIG. 5, the fixed type type constant velocity universal joint 3 comprises an outer joint member 31, an inner joint member 32, eight balls 33, and a cage 34. The outer joint member 31 is mounted to the wheel W (see FIG. 1). The inner joint member 32 is mounted to an outboard-side end portion of the intermediate shaft 4 (see FIG. 2). The eight balls 33 are configured to transmit torque between the outer joint member 31 and the inner joint member 32. The cage 34 is configured to retain the eight balls 33.

The outer joint member 31 integrally comprises a mouth section 31a and a stem section 31b. The mouth section 31a has a cup shape that is open toward one side in an axial direction of the joint (inboard side or right side in FIG. 5A). The stem section 31b extends from a bottom portion of the mouth section 31a to another side in the axial direction (outboard side or left side in FIG. 5A). Eight arc-shaped track grooves 31d extending in the axial direction are formed in a spherical inner peripheral surface 31c of the mouth section 31a. A spline 31e to be inserted into a spline hole on the wheel W side is formed in an outer peripheral surface of the stem section 31b. The mouth section 31a and the stem section 31b may be integrally made of the same material, or may be joined to each other by, for example, welding after the mouth section 31a and the stem section 31b are formed into separate sections. Further, a through hole extending in the axial direction may be formed along the axial centers of the mouth section 31a and the stem section 31b.

A spline hole 32c into which the intermediate shaft 4 (see FIG. 2) is to be inserted is formed along an axial center of the inner joint member 32. Eight arc-shaped track grooves 32e extending in the axial direction are formed in a spherical outer peripheral surface 32d of the inner joint member 32. That is, the inner joint member 32 integrally comprises a cylindrical portion 32a and a plurality of protruding portions 32b. The cylindrical portion 32a has the spline hole 32c. The plurality of protruding portions 32b protrude from the cylindrical portion 32a radially outward. The track grooves 32e are formed in circumferential regions between the plurality of protruding portions 32b. Radially outer surfaces of the plurality of protruding portions 32b form the spherical outer peripheral surface 32d of the inner joint member 32.

The track grooves 31d of the outer joint member 31 and the track grooves 32e of the inner joint member 32 are opposed to each other in a radial direction to form eight ball tracks, and the balls 33 are arranged one by one in the ball tracks, respectively. A transverse sectional shape of each of the track grooves 31d and 32e is an elliptic shape or a Gothic arch shape. With this configuration, the track grooves 31d and 32e and the balls 33 are held in contact with each other at a contact angle of from about 30° to about 45°, in other words, held in so-called angular contact with each other. A transverse sectional shape of each of the track grooves 31d and 32e may be an arc shape, and the track grooves 31d and 32e and the balls 33 may be held in so-called circular contact with each other.

A curvature center $O_{31d}$ of the track grooves 31d of the outer joint member 31, and a curvature center $O_{32e}$ of the track grooves 32e of the inner joint member 32 are offset to opposite sides in the axial direction with respect to a joint center O(f) by an equal distance. In the illustrated example, the curvature center $O_{31d}$ of the track grooves 31d of the outer joint member 31 is offset to the inboard side (joint opening side) with respect to the joint center O(f), and the curvature center $O_{32e}$ of the track grooves 32e of the inner joint member 32 is offset to the outboard side (joint deep side) with respect to the joint center O(f). With this configuration, at a freely-selected operating angle, the balls 33 retained by the cage 34 are always arranged within a plane obtained by bisection of the operating angle, thereby ensuring a constant velocity characteristic between the outer joint member 31 and the inner joint member 32.

The cage 34 has eight pockets 34a configured to retain the balls 33. All the eight pockets 34a have the same shape, and are arranged at equal intervals in a circumferential direction of the cage 34. A spherical outer peripheral surface 34b of the cage 34 is held in slide contact with the spherical inner peripheral surface 31c of the outer joint member 31. A spherical inner peripheral surface 34c of the cage 34 is held in slide contact with the spherical outer peripheral surface 32d of the inner joint member 32. A curvature center of the outer peripheral surface 34b of the cage 34 (that is, curvature center of the spherical inner peripheral surface 31c of the outer joint member 31), and a curvature center of the inner peripheral surface 34c (that is, curvature center of the spherical outer peripheral surface 32d of the inner joint member 32) match with the joint center O(f).

As illustrated in FIG. 2, as the intermediate shaft 4, a hollow shaft having a through hole 41 extending in the axial direction can be used. The intermediate shaft 4 comprises a large-diameter portion 42, small-diameter portions 43, and tapered portions 44. The large-diameter portion 42 is formed at a center of the intermediate shaft 4 in the axial direction. The small-diameter portions 43 are formed at both ends of the intermediate shaft 4 in the axial direction, respectively. Each of the tapered portions 44 connects the large-diameter portion 42 and the small-diameter portion 43. An annular groove 45 for mounting a boot and a spline 46 are formed in the small-diameter portion 43 of the intermediate shaft 4.

The small-diameter portion 43 has a constant outer diameter except for the annular groove 45 and the spline 46. The intermediate shaft 4 is not limited to the hollow shaft, and a solid shaft may also be used.

The spline 46 at an inboard-side end portion of the intermediate shaft 4 is press-fitted into the spline hole 22c of the inner joint member 22 of the plunging type constant velocity universal joint 2. Thus, the intermediate shaft 4 and the inner joint member 22 are coupled to each other in a torque transmittable manner through spline fitting. An annular recessed groove is formed in the inboard-side end portion of the intermediate shaft 4, and a snap ring 47 is fitted into the recessed groove. Through engagement of the snap ring 47 from the inboard side (shaft end side) of the inner joint member 22, the intermediate shaft 4 and the inner joint member 22 are prevented from coming off.

The spline 46 at an outboard-side end portion of the intermediate shaft 4 is press-fitted into the spline hole 32c of the inner joint member 32 of the fixed type constant velocity universal joint 3. Thus, the intermediate shaft 4 and the inner joint member 32 are coupled to each other in a torque transmittable manner through spline fitting. An annular recessed groove is formed in the outboard-side end portion of the intermediate shaft 4, and a snap ring 47 is fitted into the recessed groove. Through engagement of the snap ring 47 from the outboard side (shaft end side) of the inner joint member 32, the intermediate shaft 4 and the inner joint member 32 are prevented from coming off.

The plunging type constant velocity universal joint 2 and the fixed type constant velocity universal joint 3 described above are used exclusively for the rear-wheel drive shaft, and hence the maximum operating angle can be set smaller than that of a conventional product that is also usable for a front-wheel drive shaft. In this embodiment, both of the maximum operating angle of the plunging type constant velocity universal joint 2 and the maximum operating angle of the fixed type constant velocity universal joint 3 are set to 20° or less. In this manner, reduction in weight and size of the plunging type constant velocity universal joint 2 and the fixed type constant velocity universal joint 3 can be achieved while maintaining load capacity. In the following, internal specifications of the plunging type constant velocity universal joint 2 are described in detail.

Figure 6A:
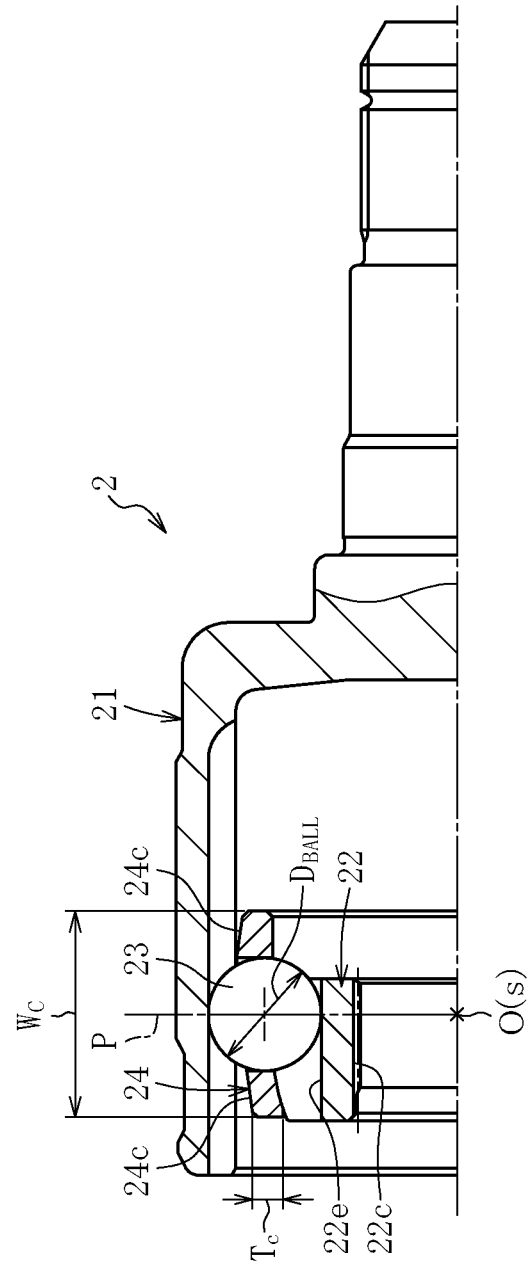
Figure 9A:
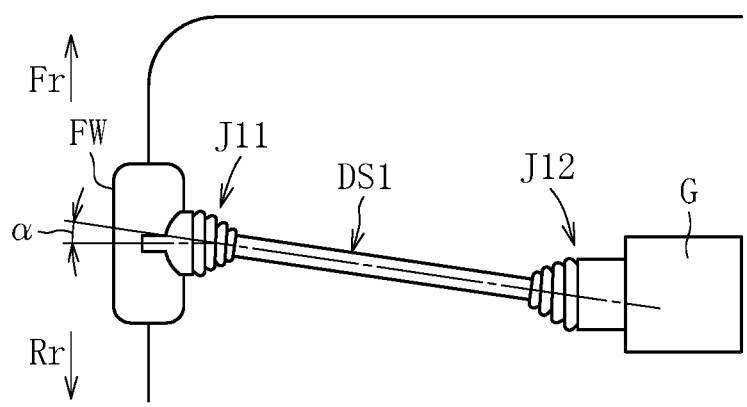
FIG. 9A is a plan view for illustrating a state in which a front-wheel drive shaft is mounted so as to be inclined with respect to a vehicle width direction.
Figure 9B:
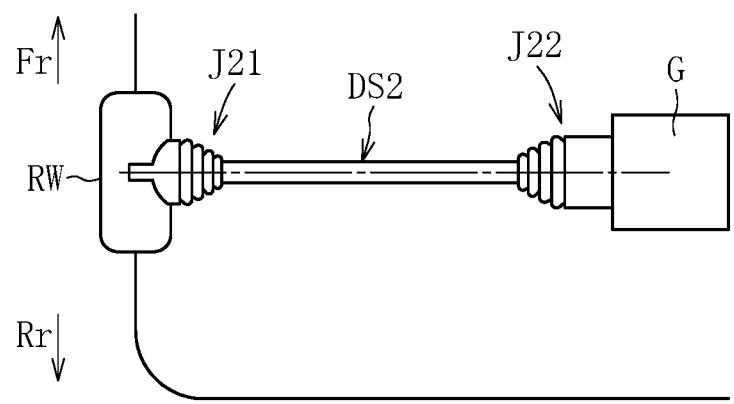
FIG. 9B is a plan view for illustrating a state in which a rear-wheel drive shaft is mounted so as to be parallel to the vehicle width direction.

In Table 1 below and FIG. 6A to FIG. 8B, the internal specifications of the plunging type constant velocity universal joint 2 being the product of the present invention are shown and illustrated in comparison to a comparative product (double offset constant velocity universal joint having a maximum operating angle of 25° and eight balls) having the same ball diameter as that of the product of the present invention. Each of FIGS. 6A, 7A and 8A is a sectional view of the plunging type constant velocity universal joint 2 being the product of the present invention, and each of FIGS. 6B, 7B and 8B is a sectional view of a plunging type constant velocity universal joint 2' being the comparative product. Each component of the comparative product is denoted by the reference symbol obtained by adding a prime (') to the reference symbol of each component of the product of the present invention.

TABLE 1

| | Product of the present invention | Comparative product |
|---|---|---|
| (1) Ball PCD ($PCD_{BALL}$)/ball diameter | 3.3 to 3.6 | 3.6 to 3.9 |
| (2) Inner ring width ($W_I$)/ball diameter | 1.2 to 1.55 | 1.6 to 1.8 |

TABLE 1-continued

|  | Product of the present invention | Comparative product |
|---|---|---|
| (3) Inner ring thickness ($T_I$)/ball diameter | 0.30 to 0.45 | 0.45 to 0.60 |
| (4) Spline PCD ($PCD_{SPL}$)/ball diameter | 1.70 to 1.85 | 1.65 to 1.75 |
| (5) Outer-ring outer diameter ($D_O$)/ spline PCD ($PCD_{SPL}$) | 2.7 to 3.0 | 3.0 to 3.3 |
| (6) Cage width ($W_C$)/ball diameter | 1.8 to 2.0 | 2.0 to 2.2 |

Parameters described above are defined as follows.

(1) Ball PCD (pitch circle diameter of the balls) $PCD_{BALL}$: The ball PCD has a value twice as large as a distance between the axial center of the outer joint member 21 and a center of the ball 23 or between the axial center of the inner joint member 22 and the center of the ball 23. That is, the ball PCD corresponds to a diameter of a circle passing centers of all of the balls 23 under a state in which the operating angle is 0°.

(2) Inner ring width (axial width of the inner joint member) $W_I$: The inner ring width is a maximum axial dimension of the inner joint member 22. In the illustrated example, the inner ring width is an axial distance between both end surfaces of the inner joint member 22.

(3) Inner ring thickness (radial thickness of the inner joint member) $T_I$: The inner ring thickness is a radial distance between a groove bottom of the track groove 22e in a joint center plane P {plane that passes the joint center O(s) and is orthogonal to an axis} and a pitch circle of the spline hole 22c. In the illustrated example, the inner joint member has a constant radial thickness in the axial direction.

(4) Spline PCD (pitch circle diameter of the spline hole of the inner joint member) $PCD_{SPL}$: The spline PCD is a diameter of a pitch circle of meshing between the spline hole 22c of the inner joint member 22 and the spline 46 (see FIG. 2) of the intermediate shaft 4.

(5) Outer-ring outer diameter $D_O$: The outer-ring outer diameter is a maximum outer diameter of the outer joint member 21.

(6) Cage width $W_C$: The cage width is a maximum axial dimension of the cage 24. In the illustrated example, the cage width is an axial distance between both end surfaces of the cage 24.

In the following, detailed description is made of a design concept leading to the above-mentioned internal specifications.

In the plunging type constant velocity universal joint 2, as the operating angle is increased, a maximum load applied to each of the balls 23 is increased. Accordingly, when the maximum operating angle is reduced as described above, the maximum load applied to each of the balls 23 is reduced. Thus, the inner joint member 22 to be held in contact with the balls 23 has a sufficient margin of strength. As a result, the radial thickness of the inner joint member 22 can be reduced. Therefore, without causing reduction in load capacity and durability, the pitch circle diameter of the track grooves 22e of the inner joint member 22, that is, the pitch circle diameter of the balls 23 arranged in the track grooves 22e can be reduced as compared to that of the comparative product {$PCD_{BALL}$<$PCD_{BALL}$', see the row (1) in Table 1 above}. In this manner, a size of the plunging type constant velocity universal joint 2 in the radial direction is reduced, and thus reduction in weight can be achieved.

The comparative product has a large maximum operating angle, and hence a circumferential length of each of pockets 24a' of a cage 24' is increased. Thus, it has been required to increase a diameter of the cage 24' in order to ensure the circumferential length of each of the pockets 24a'. Therefore, a diameter of an outer peripheral surface of an inner joint member 22' to be held in slide contact with an inner peripheral surface of the cage 24' is increased. Consequently, the inner joint member 22' has an excessively large thickness that is more than necessary in view of strength. In contrast, in the product of the present invention, when the maximum operating angle is reduced as described above, a movement amount of each of the balls 23 in the circumferential direction with respect to the cage 24 is reduced, thereby being capable of reducing the circumferential dimension of each of the pockets 24a of the cage 24 (Lp<Lp'). Accordingly, while maintaining the circumferential dimension of a pillar portion 24e between the pockets 24a (Lc≈Lc'), the diameter of the cage 24 can be reduced, and the diameter of the outer peripheral surface 22d of the inner joint member 22 to be held in slide contact with the spherical portion 24d of the inner peripheral surface of the cage 24 can be reduced. As a result, a thickness of the inner joint member 22 can be reduced so as to be set to a minimum thickness necessary in view of strength {$T_I$<$T_I$', see the row (3) in Table 1 above}. Further, the pitch circle diameter of the balls 23 is reduced as described above, thereby being capable of reducing a size of the plunging type constant velocity universal joint 2 in the radial direction.

Through reduction of the maximum operating angle of the plunging type constant velocity universal joint 2, the maximum load applied to each of the balls 23 is reduced as described above, with the result that the cage 24 held in contact with the balls 23 has a sufficient margin of strength. Accordingly, an axial thickness of an annular portion formed at each end of the cage 24 in the axial direction can be reduced while maintaining durability equivalent to that of the comparative product. Thus, an axial width of the entire cage 24 can be reduced, and hence reduction in weight can be achieved {$W_C$<$W_C$', see the row (6) in Table 1 above}.

Through reduction of the maximum operating angle of the plunging type constant velocity universal joint 2, an angle of the conical portions 24c of the outer peripheral surface of the cage 24 with respect to the axial center can be reduced, and can be set to 10° or less in this embodiment. With this configuration, a thickness (for example, a thickness $T_c$ at a joint-opening-side end portion) of a thin portion of the cage 24 can be increased, and hence strength of the cage 24 can be increased.

When the maximum operating angle of the plunging type constant velocity universal joint 2 is reduced, the radial thickness $T_1$ of the inner joint member 22 can be reduced as described above, with the result that a diameter of the spline hole 22c of the inner joint member 22 can be increased {$PCD_{SPL}$>$PCD_{SPL}$', see the row (4) in Table 1 above}. In this manner, the intermediate shaft 4 to be inserted into the spline hole 22c is increased in diameter, and thus torsional strength can be enhanced. Further, when the maximum operating angle of the plunging type constant velocity universal joint 2 is reduced, the pitch circle diameter of the balls 23 can be reduced as described above, with the result that a diameter of the outer joint member 21 can be reduced. From the above description, in the product of the present invention, a ratio $D_O$/$PCD_{SPL}$ of the outer diameter $D_O$ of the outer joint member 21 to the pitch circle diameter $PCD_{SPL}$ of the spline hole 22c of the inner joint member can be set smaller than that of the comparative product {$D_O$/$PCD_{SPL}$<$D_O$'/$PCD_{SPL}$', see the row (5) in Table 1 above}. In this manner, reduction in weight and size of the plunging type constant velocity universal joint 2, and improvement in strength of the intermediate shaft 4 can be achieved at the same time.

When the maximum operating angle of the plunging type constant velocity universal joint 2 is reduced, a movement amount of each of the balls 23 in the axial direction with respect to the inner joint member 22 is reduced. Specifically, as illustrated in FIG. 8A, an axial length (track effective length) of a locus of a contact point between the track groove 22e of the inner joint member 22 and the ball 23 is smaller in the product of the present invention having a small maximum operating angle than in the comparative product having a large maximum operating angle ($Z_I$<ZI'). With this configuration, in the product of the present invention, the axial length of each of the track grooves 22e of the inner joint member 22 and the axial width of the entire inner joint member 22 can be reduced as compared to those of the comparative product {$W_I$<$W_I'$, see the row (2) in Table 1 above}.

However, when the axial width of the inner joint member 22 is excessively small, the spline hole 22c formed along the axial center of the inner joint member 22 has an insufficient axial length, which may lead to insufficient strength of a spline fitting portion between the inner joint member 22 and the intermediate shaft 4 (see FIG. 2). In the plunging type constant velocity universal joint 2 being the product of the present invention, through reduction of the maximum operating angle, the radial thickness of the inner joint member 22 can be reduced as described above, and hence a diameter of the spline hole 22c of the inner joint member 22 can be increased. Accordingly, while maintaining the contact pressure for each spline tooth (that is, while maintaining strength of the spline fitting portion), the axial length of the spline hole 22c of the inner joint member 22 can be reduced. In the above-mentioned manner, through reduction of the axial length of each of the track grooves 22e of the inner joint member 22 and the axial length of the spline hole 22c, the axial width of the entire inner joint member 22 can be reduced as described above, and hence reduction in weight can be achieved.

As described above, according to the present invention, in consideration of various conditions obtained by reducing the maximum operating angle of the plunging type constant velocity universal joint, study is made on the internal specifications of the plunging type constant velocity universal joint, thereby reducing the weight and size of the plunging type constant velocity universal joint while maintaining torque load capacity equivalent to that of the comparative product. Thus, there can be launched a new series of plunging type constant velocity universal joints each having a small weight and a small size and being usable exclusively for the rear-wheel drive shaft.

Incidentally, when the plunging type constant velocity universal joint rotates under a state of forming a high operating angle, there is a risk in that noise is generated. In order to prevent generation of noise during such high operating angle, in the related-art plunging type constant velocity universal joint, a track PCD gap (difference between a pitch circle diameter of the track grooves of the outer joint member and a pitch circle diameter of the track grooves of the inner joint member), a gap between the outer joint member and the cage (difference between a diameter of the cylindrical inner peripheral surface of the outer joint member and a diameter of the spherical portion of the outer peripheral surface of the cage), and a spherical gap between the cage and the inner joint member (difference between the diameter of the spherical portion of the inner peripheral surface of the cage and a diameter of the spherical outer peripheral surface of the inner joint member) are each required to be set to a significantly small value. In contrast, in the above-mentioned plunging type constant velocity universal joint 2, the maximum operating angle is small, and the risk of noise can be reduced. Accordingly, the above-mentioned gaps can be set to values larger than those of the conventional product, and hence the product of the present invention is advantageous in view of manufacture.

Further, the related-art plunging type constant velocity universal joint is used also for the front-wheel drive shaft. Thus, as countermeasures against idling vibration, the inner peripheral surface of the cage is processed into a special shape so that a relatively large axial gap is formed between the inner peripheral surface of the cage and the outer peripheral surface of the inner joint member (for example, see FIG. 3 and FIG. 4 in Patent Literature 1 above). In contrast, the above-mentioned plunging type constant velocity universal joint 2 is used exclusively for the rear-wheel drive shaft. Thus, the countermeasures against idling vibration are not required, and the inner peripheral surface (portion to be held in slide contact with the inner joint member) of the cage can be formed into a simple spherical shape. Accordingly, the product of the present invention is more advantageous than the conventional product in view of manufacture.

Preferable ranges of the gaps, which are set in consideration of the above-mentioned circumstances, are shown in Table 2 below (unit: mm). Axial gaps between the pocket surfaces of the cage and the balls are equal to those of the conventional product. When minute axial gaps are formed between the pocket surfaces of the cage and the balls, rolling performance of the balls is improved, and torque transmitting efficiency is improved.

TABLE 2

| | |
|---|---|
| Track PCD gap | 0.005 to 0.200 |
| Gap between outer ring and cage | 0.005 to 0.300 |
| Spherical gap between cage and inner ring | 0.005 to 0.100 |
| Axial gap between cage and inner ring | 0.005 to 0.300 |
| Gap between cage pocket and ball | 0.005 to 0.050 |

The present invention is not limited to the above-mentioned embodiment. For example, the above-mentioned plunging type constant velocity universal joint is usable not only for the rear-wheel drive shaft of a rear-wheel drive vehicle (such as an FR vehicle) that drives only rear wheels, but also for a rear-wheel drive shaft of a four-wheel drive vehicle (in particular, a four-wheel drive vehicle in which rear wheels serve as main driving wheels). In a sport utility vehicle (SUV), wheels move up and down greatly, and angular displacement of drive shafts is large. Accordingly, the plunging type constant velocity universal joint having the low operating angle as described above is not applicable in some cases. Therefore, it is preferred that the above-mentioned plunging type constant velocity universal joint be applied to a rear-wheel drive shaft of a rear-wheel drive automobile or a four-wheel drive automobile.

REFERENCE SIGNS LIST 1 rear-wheel drive shaft
2 plunging type constant velocity universal joint
21 outer joint member
22 inner joint member
23 ball 24 cage
3 fixed type constant velocity universal joint
31 outer joint member
32 inner joint member
33 ball
34 cage
4 intermediate shaft
E engine
G differential gear
M transmission
PS propeller shaft
W wheel

The invention claimed is:

1. A plunging type constant velocity universal joint for a rear-wheel drive shaft, the plunging type constant velocity universal joint comprising:
   an outer joint member having a cylindrical inner peripheral surface in which eight track grooves extending in an axial direction of the plunging type constant velocity universal joint are formed;
   an inner joint member having a spherical outer peripheral surface in which eight track grooves extending in the axial direction are formed, and having a spline hole formed along an axial center of the inner joint member;
   eight balls arranged in ball tracks formed by the track grooves of the outer joint member and the track grooves of the inner joint member; and
   a cage, which has eight pockets configured to receive the balls, and is held in slide contact with the cylindrical inner peripheral surface of the outer joint member and the spherical outer peripheral surface of the inner joint member,
   wherein a curvature center of a spherical portion formed on an outer peripheral surface of the cage and a curvature center of a spherical portion formed on an inner peripheral surface of the cage are offset to opposite sides in the axial direction with respect to a joint center by an equal distance,
   wherein a ratio $PCD_{BALL}/D_{BALL}$ of a pitch circle diameter $PCD_{BALL}$ of the balls to a diameter $D_{BALL}$ of each of the balls is set from 3.3 to 3.6,
   wherein a ratio $T_I/D_{BALL}$ of a radial thickness $T_I$ of the inner joint member to the diameter $D_{BALL}$ of each of the balls is set from 0.30 to 0.45, and
   wherein a ratio $PCD_{SPL}/D_{BALL}$ of a pitch circle diameter $PCD_{SPL}$ of the spline hole of the inner joint member to the diameter $D_{BALL}$ of each of the balls is set from 1.70 to 1.85.

2. The plunging type constant velocity universal joint according to claim 1, wherein a ratio $D_O/PCD_{SPL}$ of an outer diameter $D_O$ of the outer joint member to the pitch circle diameter $PCD_{SPL}$ of the spline hole of the inner joint member is set from 2.7 to 3.0.

3. The plunging type constant velocity universal joint according to claim 1, wherein the plunging type constant velocity universal joint has a maximum operating angle of 20° or less.

4. The plunging type constant velocity universal joint according to claim 1, wherein a ratio $W_I/D_{BALL}$ of an axial width $W_I$ of the inner joint member to the diameter $D_{BALL}$ of each of the balls is set from 1.2 to 1.55.

5. The plunging type constant velocity universal joint according to claim 1, wherein a ratio $W_C/D_{BALL}$ of an axial width $W_C$ of the cage to the diameter $D_{BALL}$ of each of the balls is set from 1.8 to 2.0.

\* \* \* \* \*